United States Patent Office 3,277,138
Patented Oct. 4, 1966

3,277,138
METHOD FOR THE CHLORINATION OF AROMATIC ISOCYANATES
Hans Holtschmidt, Cologne-Stammheim, and Otto Bayer and Eberhart Degener, Leverkusen, Germany, assignors to Farbenfabriken Bayer Aktiengesellschaft, Leverkusen, Germany, a German corporation
No Drawing. Filed May 6, 1963, Ser. No. 278,395
Claims priority, application Germany, May 10, 1962, F 36,762
5 Claims. (Cl. 260—453)

This invention relates to organic polyisocyanates and more particularly to perhalogenated aromatic isocyanates and their methods of manufacture.

Aromatic isocyanates have been found to be valuable commerical intermediates in the production of polyurethane materials. These polyurethane materials or plastics have been commercially utilized in the manufacture of polyurethane foams, rubber substitutes, coatings, millable gums, adhesives, and other varied and similar products. It has become desirable in the production of many of these polyurethane and other products to use an isocyanate material which has been prehalogenated and especially perchlorinated, for example, in the manufacture of hydrolysis stable urethanes. These perhalogenated isocyanates also may be useful in the production of carbodiimides.

Generally, it is known that aryl isocyanates may be chlorinated under conventional conditions of nucelar chlorination. In a great majority of these processes only one or two chlorine atoms enter or are attached to the aryl nucleus. There have been other methods disclosed whereby mixed higher tri- and tetra-chlorinated products are obtained from selected diisocyanates by halogenation via various halogen transmitters. The known methods (for example, similar to those described in U.S. Patent 2,915,545) invariably produce product mixers of varied stages of chlorination which can only be separated by expensive and comparatively involved methods. Also, when it is desired to obtain one particular chlorinated isocyanate from the reaction mixture separation problems are encountered especially upon distillation because of the tendency of some of the products to polymerize. Thus because of resutling mixtures of various chlorinated isocyanates and the separation problems encountered in isolation of each, the commerical success of these processes have been somewhat limited.

It is, therefore, an object of this invention to provide an economical process for the production of perhalogenated aromatic isocyanates devoid of the foregoing disadvantages. Another object of this invention is to provide a method for the production of perhalogenated aryl isocyanates whereby substantially high yields of the perhalogenated compounds are obtained. Another object of this invention is to provide a process for the preparation of perhalogenated aryl isocyanates wherein a product having a high degree of purity is obtained. A still further object of this invention is to provide a process for the production of perhalogenated aryl isocyanates whereby the perhalogenated isocyanate may be separated from the resulting reaction mixture without any significant polymerization occurring. Another object of this invention is to provide perhalogenated aryl isocyanates which have heretofore been unavailable in the art. A yet still further object of this invention is to provide a novel class of compounds which have valuable utility as intermediate products in the manufacture of polyurethane materials.

The foregoing objects and others are accomplished in accordance with this invention, generally speaking, by providing a method for the production of perhalogenated aryl isocyanates which comprises: (1) in a first step, subjecting the aryl nucleus of an aromatic isocyanate to an initial halogenation at a temperature of from about −20° C. to 150° C., in the absence of a metallic halogenation catalyst; and (2) in a second step, halogenating the resulting product (from the first step) at a temperature of from about 210 to 250° C. in the presence of from about 0.1 to 10% of an inorganic metal salt halogenation catalyst. The resulting halogenated product of the first step must be halogen-substituted at the positions ortho to the —NCO groups since these ortho positioned halogen atoms hinder or shield the isocyanate groups from later reaction in the second step. It is important that the first step be conducted at the above-indicated about −20° C. to 150° C. temperature since the use of any higher temperatures during halogenation would cause significant side reactions. Also, if a metallic halogenation catalyst were used in the first step halogenation, it would not be possible to obtain the final high yields of perhalogenated isocyanate in the second step.

Desirable yields of perchlorinated aryl isocyanates may be obtained in a high degree of purity by carrying out the chlorination (halogenation) of the aryl isocyanate in two stages as above defined. The aryl nucleus is first subjected to an initial chlorination in the cold or at a slightly elevated temperature, i.e., between about −20° C. and +150° C., preferably between about 0° C. and about 100° C., without a metal catalyst. In this stage, the reactive hydrogen atoms which are in the ortho and para position to the —NCO group are substituted by chlorine. If desired, this stage of chlorination may be carried out in the presence of non-metallic halogen carriers (e.g., iodine). The effect of this is that two side reactions which would considerably reduce the yield are inhibited in the subsequent second chlorinating stage in the presence of metallic halogen carriers. The tendency of the —NCO group to polymerize, which is very particularly marked in the presence of heavy metal salts and at temperatures above about 200° C. is almost completely inhibited by the chlorine atoms in the ortho position due to steric effects. In addition, a Friedel-Crafts reaction of the —NCO group, which would produce high yields of carbonamides in the presence of $AlCl_3$, $FeCl_3$ and other metal salts generally used as halogen carriers is prevented from taking place, owing to the fact that the most reactive hydrogen atoms, at which this reaction might take place have already been substituted by chlorine. For this reason, the second stage of chlorination may be carried out in the presence of about 0.1 to 10%, preferably about 1 to 3% of $FeCl_3$, $FeBr_3$, $FeI_3$, $AlCl_3$, $SbCl_3$, $Sb_2S_3$, $SbCl_5$, $SnCl_4$, $TiCl_4$ and other customary halogen carriers at temperatures which would otherwise lead to quantitative polymerization of the —NCO group or to the above-mentioned formation of carbonamide. In accordance with the invention, it is necessary to raise the temperature in the second chlorinating stage to about 210 to 250° C. in order to obtain uniform aryl isocyanates which are completely free from hydrogen and thus to prevent the formation of mixtures of chlorinated compounds which would be very difficult to separate. The yields of percholroaryl isocyanates obtained by this method generally are above 90%.

Examples of aryl isocyanates which are suitable for the process of this invention include m-phenylene diisocyanate, p-phenylene diisocyanate, phenyl isocyanate, 2,4,-toluylene diisocyanate, 2,6-toluylene diisocyanate, toluyl isocyanate, 3,3'-dimethyl, 4,4'-biphenylene, diisocyanate, 3,3' - dimethoxy-4,4' - biphenylene diisocyanate, 3,3' - diphenyl-4,4'-biphenylene diisocyanate, 1-trichloro methyl-2,4-diisocyanato benzene, 2-isocyanato diphenyl ether, diphenyl sulfone-4-isocyanate, 3-isocyanato-acetophenone, diphenyl methane-4,4'-diisocyanate, di-phenyl-4,4'-diisocyanate, naphthalene-1,5-diisocyanate, triphenyl methane-4,4',4''-triisocyanate, 4,4'-diisocyanato diphenyl sulfone and mixtures thereof.

It is, of course, possible to start with an isocyanate as above listed that has already been halogenated in the nucleus, and in some cases these may then be perchlorinated directly at high temperatures. Such compounds include 2,4-dichlorophenylene-1,3-diisocyanate, 1-fluoro-4-isocyanato-benzene and 2,4-dichlorophenyl isocyanate.

Chlorination may in many cases be carried out without solvent or diluent. In the case of isocyanates which have a high melting point, it is advisable to carry out the first chlorinating stage in the presence of a solvent such as chloroform, tetrachloroethane or trichlorobenzene and then to distill off the solvent and to work without the solvent in the second chlorinating stage.

The end products may be isolated by distillation or recrystallization. It is surprising that the perchlorinated aryl isocyanates may be distilled off from the metal catalyst without polymerization occurring.

The perchloroaryl isocyanates prepared by the process of the invention are mostly compounds which could heretofore not be prepared in such state of purity. They hitherto always resulted in processes yielding mixtures of chloroarylisocyanates with various degrees of chlorination including the perchlorinated stage. It has been practically impossible to separate the perchlorinated individuals to a commercially reasonable extent. They cannot be prepared by the classical methods for preparing isocyanates by phosgenating the corresponding amines since these amines are very difficult to obtain, if they can be obtained at all or, as for example, in the case of pentachloro aniline, cannot be converted to isocyanates with phosgene. The new compounds are valuable intermediate products for manufacturing synthetic materials, insecticides and pharmaceuticals.

The invention is further illustrated by the following examples in which the parts are by weight unless otherwise specified.

Example 1

Chlorine is passed into a mixture comprising: about 160 parts (1 mol) of p-phenylene diisocyanate, about 160 parts of chloroform, and about 2% iodine at about 40 to 50° C. until the exothermic reaction is complete. The chloroform is then distilled off, about 1% ferric chloride is added to the resulting solution and chlorination is then continued. The chlorination at first continues with an evolution of heat up to about 120° C. After the exothermic reaction is completed, the chlorination is continued for about another three hours with a gradual increase in temperature until it reaches a temperature of about 250° C. Nitrogen is then blown through the reaction mixture at about 150° C. and the melt which has solidified upon cooling is recrystallized in ligroin. The tetrachloro-1,4-diisocyanato benzene thereby produced melts at about 117 to 118° C. A yield of about 94.3% of theoretical was obtained.

Analysis:

| Calculated: | Percent |
|---|---|
| C | 32.2 |
| N | 9.4 |
| Cl | 47.6 |
| Found: | |
| C | 32.3 |
| N | 9.6 |
| Cl | 47.5 |

Example 2

About 160 parts (1 mol) of m-phenylene diisocyanate are melted, treated with about 2% iodine and chlorinated (as in above Example 1) at a temperature of about 50 to 100° C. until the reaction is no longer exothermic. About 1% ferric chloride is then added and the temperature is slowly raised to about 210 to 250° C. while chlorination is continued until no further release of HCl is observed and the theoretical quantity of chlorine has been taken up. The reaction product is then distilled under a high vacuum. A yield of about 92% of theoretical was obtained:

| Boiling point at 0.04 mm. Hg, ° C. | 115 to 120 |
|---|---|
| Melting point, ° C. | 77 to 78 |
| NCO number: | |
| Calc. | 28.2 |
| Found | 27.8 |

Example 3

Chlorine is passed into about 300 parts of phenyl isocyanate at about 100° C. for about 8 hours under ultraviolet illumination. About 18 parts of anhydrous iron chloride are then added, and the temperature is raised to about 230° C. while more chlorine is introduced. After chlorinating for about 40 hours, the reaction product is distilled under a high vacuum. The total product boils at about 128 to about 133° C. at a pressure of about 0.2 mm. Hg. The yield is about 555 parts of pentachlorophenyl isocyanate.

The product is a crystalline compound, melting point about 99 to about 101° C. It can be recrystallized from gasoline used for cleaning, but this does not lead to any rise in the melting point.

Analysis:

| Calculated: | Percent |
|---|---|
| C | 28.8 |
| O | 5.5 |
| N | 4.8 |
| Cl | 60.9 |
| Found: | |
| C | 28.8 |
| O | 5.7 |
| N | 5.0 |
| Cl | 60.8 |
| NCO number: | |
| Theoretical | 14.3 |
| Found | 13.8 |

Example 4

About 250 parts of diphenylmethane-4,4'-diisocyanate (1 mol) are chlorinated with the addition of about 2% iodine at a temperature of about 50 to about 60° C. and then after the evolution of heat has ceased, the compound is chlorinated at about 220 to about 250° C. in the presence of about 1% ferric chloride.

A slightly viscous brown oil is left, which contains less than about 0.3% of hydrogen and has the calculated NCO number.

The use of other halogens, isocyanates and catalysts than those illustrated in the above examples give similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the production of chlorinated aromatic isocyanates consisting essentially of reacting chlorine with an aromatic isocyanate at a temperature of from about —20° C. to about 150° C. in a first step to produce an aromatic isocyanate having chlorine at a position ortho to the —NCO group on the aryl nucleus and then chlorinating the reaction mixture in a second subsequent step at a temperature of from about 210° C. to about 250° C. to perchlorinate the aryl nucleus in the presence of from about 0.1 to about 10% of $FeCl_3$, $FeBr_3$, $FeI_3$, $AlCl_3$, $SbCl_3$, $Sb_2S_3$, $SbCl_5$, $SnCl_4$ or $TiCl_4$ as catalysts.

2. The process of claim 1 wherein the first chlorination step is conducted in the presence of an inert chlorine containing organic solvent.

3. A process for the production of chlorinated aromatic isocyanates consisting essentially of reacting chlorine with an aromatic isocyanate having an active hydrogen ortho to the —NCO group at a temperature of from about −20° C. to about 150° C. in a first step to produce an aromatic isocyanate having chlorine at a position ortho to the —NCO group on the aryl nucleus and then chlorinating the reaction mixture in a second subsequent step at a temperature of from about 210° C. to about 250° C. to perchlorinate the aryl nucleus in the presence of from about 0.1 to about 10% of $FeCl_3$, $FeBr_3$, $FeI_3$, $AlCl_3$, $SbCl_3$, $Sb_2S_3$, $SbCl_5$, $SnCl_4$ or $TiCl_4$ as catalysts.

4. A two step process for the production of chlorinated aromatic isocyanates consisting essentially of reacting in a first step p-phenylene diisocyanate with chlorine at a temperature of from about 40° to about 50° C. in the presence of chloroform, removing the chloroform and thereafter chlorinating the reaction mixture at a temperature of about 250° C. to perchlorinate the aryl nucleus in the presence of about 1 percent ferric chloride.

5. A two step process for the production of chlorinated aromatic isocyanates consisting essentially of first chlorinating diphenyl methane-4,4'-diisocyanate in the presence of about 2 percent iodine at a temperature of from about 50° to about 60° C. and thereafter chlorinating the mixture at a temperature of from about 210 to about 250° C. to perchlorate the aryl nuclei in the presence of about 1 percent ferric chloride.

References Cited by the Examiner

UNITED STATES PATENTS

| 2,786,864 | 3/1957 | Wirth et al. | 260—453 |
| 2,915,455 | 12/1959 | Tazuma | 260—453 |
| 2,945,875 | 7/1960 | Tazuma | 260—453 |

OTHER REFERENCES

Berkmann et al.: Catalysts, Reinhold Publishing Company, 1940, pp. 907–922.

CHARLES B. PARKER, *Primary Examiner.*

DALE R. MAHANAND, JOSEPH P. BRUST,
*Assistant Examiners.*